United States Patent
Kwon et al.

(10) Patent No.: US 9,534,669 B1
(45) Date of Patent: Jan. 3, 2017

(54) PLANETARY GEAR TRAIN OF AUTOMATIC TRANSMISSION FOR VEHICLES

(71) Applicant: Hyundai Motor Company, Seoul (KR)

(72) Inventors: Hyun Sik Kwon, Seoul (KR); Seong Wook Hwang, Gyeonggi-do (KR); Wonmin Cho, Gyeonggi-do (KR); Jae Chang Kook, Gyeonggi-do (KR); Seongwook Ji, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/213,835

(22) Filed: Jul. 19, 2016

(30) Foreign Application Priority Data

Mar. 16, 2016 (KR) .................. 10-2016-0031665

(51) Int. Cl.
*F16H 3/62* (2006.01)
*F16H 3/66* (2006.01)

(52) U.S. Cl.
CPC ......... *F16H 3/66* (2013.01); *F16H 2200/0065* (2013.01); *F16H 2200/2012* (2013.01); *F16H 2200/2046* (2013.01)

(58) Field of Classification Search
CPC .............. F16H 3/66; F16H 2200/006; F16H 2200/2012; F16H 2200/2046; F16H 3/666
See application file for complete search history.

(56) References Cited

U.S. PATENT DOCUMENTS

| | | | | |
|---|---|---|---|---|
| 7,566,283 | B2* | 7/2009 | Gumpoltsberger | F16H 3/66 475/275 |
| 2007/0225108 | A1* | 9/2007 | Kamm | F16H 3/66 475/275 |
| 2012/0214635 | A1* | 8/2012 | Mellet | F16H 3/666 475/276 |
| 2012/0329600 | A1* | 12/2012 | Park | F16H 3/66 475/276 |

* cited by examiner

*Primary Examiner* — David J Hlavka
(74) *Attorney, Agent, or Firm* — Mintz Levin Cohn Ferris Glovsky and Popeo, P.C.; Peter F. Corless

(57) ABSTRACT

A planetary gear train of an automatic transmission for a vehicle is provided. The planetary gear train includes an input shaft that receives an engine torque, an output shaft that outputs a shifted torque, and planetary gear sets. Additionally, shafts are connected with respective rotational elements. The planetary gear train thus improves power delivery performance and reduces fuel consumption by achieving nine forward speed stages using a minimum number of constituent elements.

8 Claims, 2 Drawing Sheets

FIG. 2

| Shift-stage | Control element | | | | | | Gear ratio |
|---|---|---|---|---|---|---|---|
| | B1 | B2 | C1 | C2 | C3 | C4 | |
| D1 | | ● | ● | | ● | | 5.320 |
| D2 | | ● | ● | ● | | | 2.800 |
| D3 | | ● | ● | | | ● | 2.690 |
| D4 | | | ● | | ● | ● | 1.000 |
| D5 | ● | | ● | | | ● | 0.705 |
| D6 | ● | | ● | ● | | | 0.700 |
| D7 | ● | | ● | | ● | | 0.649 |
| D8 | ● | | | ● | ● | | 0.600 |
| D9 | ● | | | | ● | ● | 0.467 |
| REV | | ● | | | ● | ● | 1.400 |

US 9,534,669 B1

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0031665 filed in the Korean Intellectual Property Office on Mar. 16, 2016, the entire contents of which are incorporated herein by reference.

BACKGROUND (a) Field of the Invention

The present invention relates to an automatic transmission for a vehicle, and more particularly, to a planetary gear train of an automatic transmission of a vehicle that improves power delivery performance and reduces fuel consumption by achieving nine forward speed stages using a minimum number of constituent elements.

(b) Description of the Related Art

Research regarding realizing more shift-stages of an automatic transmission is being conducted to achieve enhancement of fuel consumption and improved drivability, and recently, increase of oil price is triggering a competition in enhancing fuel consumption of a vehicle. In particular, research regarding an engine has been conducted to achieve weight reduction and to enhance fuel consumption by downsizing and research regarding an automatic transmission has been conducted to simultaneously provide improved drivability and fuel consumption by achieving more shift stages.

To achieve more shift stages for an automatic transmission, the number of parts is typically increased, which may deteriorate installability, production cost, weight and/or power flow efficiency. Therefore, to maximally enhance fuel consumption of an automatic transmission having more shift stages, it is important for improved efficiency to be derived by a smaller number of parts. In this respect, an eight-speed automatic transmission has been recently introduced, and a planetary gear train for an automatic transmission enabling more shift stages is being researched.

An automatic transmission of eight or more shift-stages typically includes three to four planetary gear sets and five to six control elements (frictional elements), and may easily become lengthy, thereby deteriorating installability. In this regard, disposing planetary gear sets in parallel or employing dog clutches instead of wet-type control elements has been contemplated. However, such an arrangement may not be widely applicable, and using dog clutches may deteriorate shift-feel.

The above information disclosed in this section is merely for enhancement of understanding of the background of the invention and therefore it may contain information that does not form the prior art that is already known in this country to a person of ordinary skill in the art.

SUMMARY

The present invention provides a planetary gear train of an automatic transmission for a vehicle having advantages of obtaining shift-stages of at least nine forward speeds and at least one reverse speed by minimal number of parts, improving power delivery performance and fuel consumption by multi-stages of an automatic transmission, and improving driving stability of a vehicle by utilizing a low rotation speed of an engine.

A planetary gear train according to an exemplary embodiment of the present invention may include: an input shaft configured to receive an engine torque; an output shaft configured to output a shifted torque; a first planetary gear set having first, second, and third rotational elements; a second planetary gear set having fourth, fifth, and sixth rotational elements; a third planetary gear set having seventh, eighth, and ninth rotational elements; a fourth planetary gear set having tenth, eleventh, and twelfth rotational elements; a first shaft connected with the first rotational element; a second shaft interconnecting the second rotational element, the fourth rotational element, and seventh rotational element, and directly connected with the input shaft; a third shaft interconnecting the third rotational element and the eleventh rotational element; a fourth shaft interconnecting the fifth rotational element and the ninth rotational element, and selectively connected with the third shaft; a fifth shaft connected with the sixth rotational element; a sixth shaft connected with the eighth rotational element; a seventh shaft connected with the tenth rotational element, and selectively connected with the fourth shaft and the fifth shaft respectively; and an eighth shaft connected with the twelfth rotational element, selectively connected with the sixth shaft, and directly connected with the output shaft.

The first shaft and the third shaft may be selectively connected with a transmission housing respectively. The first, second, and third rotational element of the first planetary gear set may be respectively a first sun gear, a first planet carrier, and a first ring gear of the first planetary gear set. The fourth, fifth, and sixth rotational element of the second planetary gear set may be respectively a second sun gear, a second planet carrier, and a second ring gear of the second planetary gear set. The seventh, eighth, and ninth rotational elements of the third planetary gear set may be respectively a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

A planetary gear train according to an exemplary embodiment of the present invention may further include: a first clutch that selectively connects the sixth shaft and the eighth shaft; a second clutch that selectively connects the third shaft and the fourth shaft; a third clutch that selectively connects the fourth shaft and the seventh shaft; a fourth clutch that selectively connects the fifth shaft and the seventh shaft; a first brake that selectively connects the first shaft and the transmission housing; and a second brake that selectively connects the third shaft and the transmission housing.

According to an exemplary embodiment of the present invention, shift-stages of at least nine forward speeds and at least one reverse speed may be realized by a combination of four planetary gear sets of simple planetary gear sets and six control elements. In addition, a planetary gear train according to an exemplary embodiment of the present invention may substantially improve driving stability by realizing shift-stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption. Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 2 is an operational chart for respective control elements at respective shift-stages in a planetary gear train according to an exemplary embodiment of the present invention.

DESCRIPTION OF SYMBOLS

Figure 1:
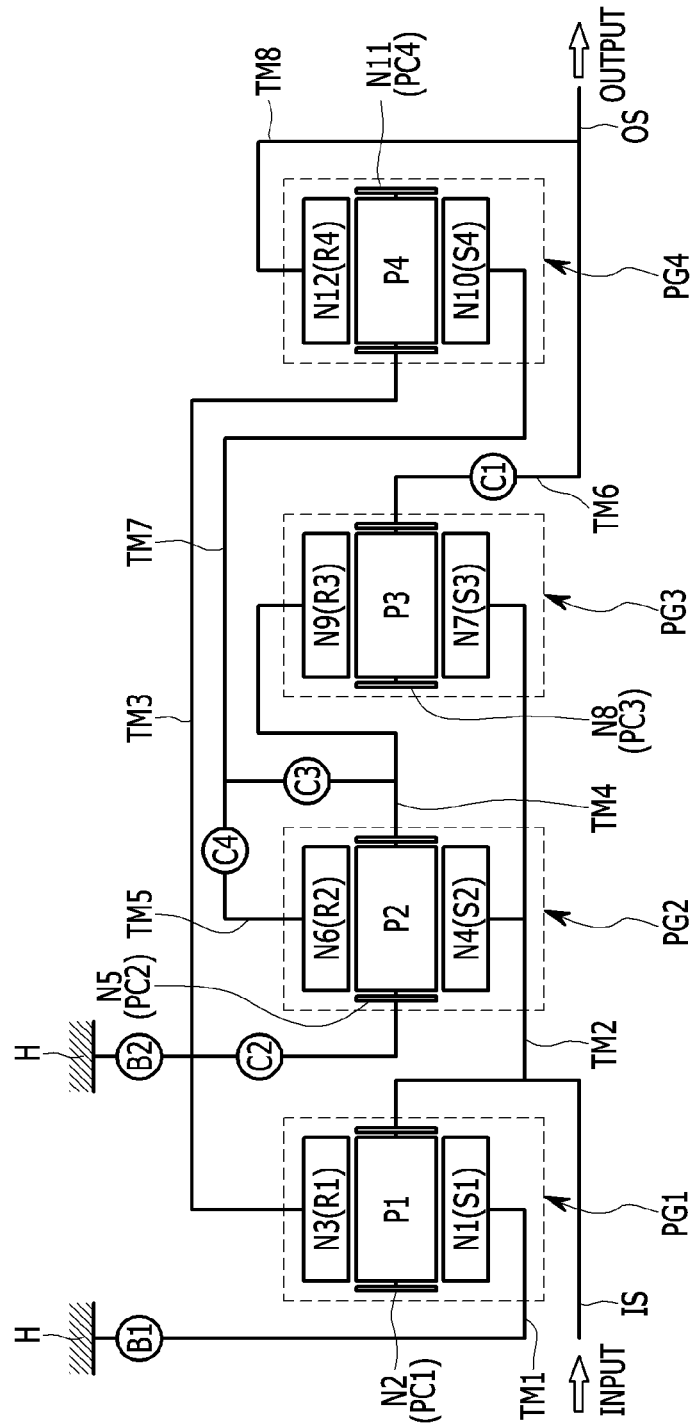
FIG. 1 is a schematic diagram of a planetary gear train according to an exemplary embodiment of the present invention.

B1, B2 . . . first and second brakes
C1, C2, C3, C4 . . . first, second, third, and fourth clutches
PG1, PG2, PG3, PG4 . . . first, second, third, and fourth planetary gear sets
S1, S2, S3, S4 . . . first, second, third, and fourth sun gears
PC1, PC2, PC3, PC4 . . . first, second, third, and fourth planet carriers
R1, R2, R3, R4 . . . first, second, third, and fourth ring gears
IS . . . input shaft
OS . . . output shaft
TM1, TM2, TM3, TM4, TM5, TM6, TM7, TM8 . . . first, second, third, fourth, fifth, sixth, seventh, and eighth shafts

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to drawings. The drawings and description are to be regarded as illustrative in nature and not restrictive, and like reference numerals designate like elements throughout the specification. In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention. Referring to FIG. 1, a planetary gear train according to an exemplary embodiment of the present invention may include first, second, third, and fourth planetary gear set PG1, PG2, PG3, and PG4, arranged on a same axis, an input shaft IS, an output shaft OS, eight shafts TM1 to TM8 interconnecting rotational elements of the first, second, third, and fourth planetary gear set PG1, PG2, PG3, and PG4, four clutches C1 to C4 and two brakes B1 and B2 as control elements, and a transmission housing H.

In particular, torque input from the input shaft IS may be shifted by cooperative operation of the first, second, third, and fourth planetary gear sets PG1, PG2, PG3, and PG4, and then output through the output shaft OS. The planetary gear sets may be disposed in the order of first, second, third, and fourth planetary gear sets PG1, PG2, PG3, and PG4, from an engine side. The input shaft IS is an input member and the torque from a crankshaft of an engine may be input into the input shaft IS, after being torque-converted by a torque converter. The output shaft OS is an output member, may be disposed on a same axis with the input shaft IS, and may be configured to deliver a shifted driving torque to a drive shaft using a differential apparatus.

The first planetary gear set PG1 is a single pinion planetary gear set, and may include a first planet carrier PC1 that supports first pinion gear P1 externally engaged with the first sun gear S1, and a first ring gear R1 internally engaged with the first pinion gear P1. The first sun gear S1 may operate as a first rotational element N1, the first planet carrier PC1 may operate as a second rotational element N2, and the first ring gear R1 may operate as a third rotational element N3. The second planetary gear set PG2 is a single pinion planetary gear set, and may include a second planet carrier PC2 that supports second pinion gear P2 externally engaged with the second sun gear S2, and a second ring gear R2 internally engaged with the second pinion gear P2. The second sun gear S2 may operate as a fourth rotational element N4, the second planet carrier PC2 may operate as a fifth rotational element N4, and the second ring gear R2 may operate as a sixth rotational element N6.

Additionally, the third planetary gear set PG3 is a single pinion planetary gear set, and may include a third planet carrier PC3 that supports third pinion gear P3 externally engaged with the third sun gear S3, and a third ring gear R3 internally engaged with the third pinion gear P3. The third sun gear S3 may operate as a seventh rotational element N7, the third planet carrier PC3 may operate as an eighth rotational element N8, and the third ring gear R3 may operate as a ninth rotational element N9. The fourth planetary gear set PG4 is a single pinion planetary gear set, and may include a fourth planet carrier PC4 that supports fourth pinion gear P4 externally engaged with the fourth sun gear S4, and a fourth ring gear R4 internally engaged with the fourth pinion gear P4. The fourth sun gear S4 may operate as a tenth rotational element N10, the fourth planet carrier PC4 may operate as a eleventh rotational element N11, and the fourth ring gear R4 may operate as a twelfth rotational element N12.

In the first, second, third, and fourth planetary gear set PG1, PG2, PG3, and PG4, the second rotational element N2 may be directly connected with the fourth rotational element N4 and the seventh rotational element N7, the third rotational element N3 may be directly connected with the eleventh rotational element N11, and the fifth rotational element N5 may be directly connected with the ninth rotational element N9, by eight shafts TM1 to TM8. The eight shafts TM1 to TM8 are hereinafter described in detail. Each of the eight shafts TM1 to TM8 may be a rotational member that directly interconnects the input and output shafts and rotational elements of the planetary gear sets PG1, PG2, PG3, and PG4, or may be a fixed member fixed to the transmission housing H.

In particular, the first shaft TM1 may be connected with the first rotational element N1 (the first sun gear S1), and selectively connected with the transmission housing H, to selectively operate as a fixed element. The second shaft TM2 may directly connect the second rotational element N2 (the first planet carrier PC1), the fourth rotational element N4, and the seventh rotational element N7 (the third sun gear S3), and may be directly connected with the input shaft IS to operate as an input element.

The third shaft TM3 may directly connect the third rotational element N3 (the first ring gear R1) and the eleventh rotational element N11 (the fourth planet carrier PC4), and selectively connected with the transmission housing H, to selectively operate as a fixed element. The fourth shaft TM4 may directly connect the fifth rotational element N5 (the second planet carrier PC2) and the ninth rotational element N9 (the third ring gear R3), and may be selectively connected with the third shaft TM3. The fifth shaft TM5 may be connected with the sixth rotational element N6 (the second ring gear R3).

Additionally, the sixth shaft TM6 may be connected with the eighth rotational element N8 (the third planet carrier PC3). The seventh shaft TM7 may be connected the tenth rotational element N10 (the fourth sun gear S4), and may be selectively connected with the fourth shaft TM4 and fifth shaft TM5 respectively. The eighth shaft TM8 may be connected with the twelfth rotational element N12 (the fourth ring gear R4), may be selectively connected with the sixth TM6, and may be directly connected with the output shaft OS to operate as an output element. The eight shafts TM1 to TM8, the input shaft IS, and the output shaft OS may be selectively interconnected with one another by control elements of four clutches C1, C2, C3, and C4. The various control elements may be operated by a single integrated controller.

The eight shafts TM1 to TM8 may be selectively connected with the transmission housing H, by control elements of two brakes B1 and B2. The four clutches C1 to C4 and the two brakes B1 and B2 are arranged as described herein below.

The first clutch C1 may be disposed between the sixth shaft TM6 and the eighth shaft TM8 and may selectively connect the sixth shaft TM6 and the eighth shaft TM8 connected with the output shaft OS to adjust power delivery therebetween. The second clutch C2 may be disposed between the third shaft TM3 and the fourth shaft TM4, and may selectively connect the third shaft TM3 and the fourth shaft TM4, to adjust power delivery therebetween. The third clutch C3 may be disposed between the fourth shaft TM4 and the seventh shaft TM7, and may selectively connect the fourth shaft TM4 and the seventh shaft TM7, to adjust power delivery therebetween. The fourth clutch C4 may be disposed between the fifth shaft TM5 and the seventh shaft TM7, and may selectively connect the fifth shaft TM5 and the seventh shaft TM7, to adjust power delivery therebetween.

The first brake B1 may be disposed between the first shaft TM1 and the transmission housing H, and may selectively connect the first shaft TM1 to the transmission housing H. The second brake B2 may be disposed between the third shaft TM3 and the transmission housing H, and may selectively connect the third shaft TM3 to the transmission housing H. The respective control elements of the first, second, third, and fourth clutches C1, C2, C3, and C4 and the first and second brakes B1 and B2 may be realized as multi-plate hydraulic pressure friction devices frictionally engaged by hydraulic pressure.

FIG. 2 is an operational chart for respective control elements at respective shift-stages in a planetary gear train according to an exemplary embodiment of the present invention. Referring to FIG. 2, a planetary gear train according to an exemplary embodiment of the present invention may realize nine forward speeds and one reverse speed by operating three control elements among the first, second, third, and fourth clutches C1, C2, C3, and C4 and the first and second brakes B1 and B2 at respective shift-stages.

In the forward first speed shift-stage D1, the first brake B1 and the first and third clutches C1 and C3 may be operated simultaneously. As a result, the sixth shaft TM6 may be connected with the eighth shaft TM8 by the operation of the first clutch C1, and the fourth shaft TM4 may be connected with the seventh shaft TM7 by the operation of the third clutch C3. Particularly, the torque of the input shaft IS may be input to the second shaft TM2. In addition, the third shaft TM3 may operate as a fixed element by the operation of the second brake B2, thereby realizing the forward first speed by cooperative operation of respective shafts and may be configured to thus output a shifted torque to the output shaft OS connected with the eighth shaft TM8.

In the forward second speed shift-stage D2, the second brake B2 and the first and second clutches C1 and C2 may be operated simultaneously. As a result, the sixth shaft TM6 may be connected with the eighth shaft TM8 by the operation of the first clutch C1, and the third shaft TM3 is connected with the fourth shaft TM4 by the operation of the second clutch C2. Particularly, the torque of the input IS may be input to the second shaft TM2. In addition, the third shaft TM3 may operate as a fixed element by the operation of the second brake B2, thereby realizing the forward second speed by cooperative operation of respective shafts and may be configured to thus output a shifted torque to the output shaft OS connected with the eighth shaft TM8.

In the forward third speed shift-stage D3, the second brake B2 and the first and fourth clutches C1 and C4 may be operated simultaneously. As a result, the sixth shaft TM6 may be connected with the eighth shaft TM8 by the operation of the first clutch C1, and the fifth shaft TM5 may be connected with the seventh shaft TM7 by the operation of the fourth clutch C4. Particularly, the torque of the input IS may be input to the second shaft TM2. In addition, the third shaft TM3 may operate as a fixed element by the operation of the second brake B2, thereby realizing the forward third speed by cooperative operation of respective shafts and may be configured to thus output a shifted torque to the output shaft OS connected with the eighth shaft TM8.

In the forward fourth speed shift-stage D4, the first, third, and fourth clutch C1, C3, and C4 may be operated simultaneously. As a result, the sixth shaft TM6 may be connected with the eighth shaft TM8 by the operation of the first clutch C1, the fourth shaft TM4 may be connected with the seventh shaft TM7 by the operation of the third clutch C3, and the fifth shaft TM5 may be connected with the seventh shaft TM7 by the operation of the fourth clutch C4. Particularly, the torque of the input shaft IS may be input to the second shaft TM2. The second, third, and fourth planetary gear sets PG2, PG3, and PG4 may be configured to rotate integrally, and a torque may be output as input, thereby forming the forward fourth speed and may be configured to thus output the inputted torque to the output shaft OS connected with the eighth shaft TM8.

In the forward fifth speed shift-stage D5, the first brake B1 and the first and fourth clutches C1 and C4 may be operated simultaneously. As a result, the sixth shaft TM6 may be connected with the eighth shaft TM8 by the operation of the first clutch C1, and the fifth shaft TM5 may be connected with the seventh shaft TM7 by the operation of the fourth clutch C4. Particularly, the torque of the input IS may be input to the second shaft TM2. In addition, the first shaft TM1 may operate as a fixed element by the operation of the first brake B1, thereby realizing the forward fifth speed by cooperative operation of respective shafts and may be configured to thus output a shifted torque to the output shaft OS connected with the eighth shaft TM8.

In the forward sixth speed shift-stage D6, the first brake B1 and the first and second clutches C1 and C2 may be operated simultaneously. As a result, the sixth shaft TM6 may be connected with the eighth shaft TM8 by the operation of the first clutch C1, and the third shaft TM3 may be connected with the fourth shaft TM4 by the operation of the fourth clutch C2. Particularly, the torque of the input IS may be input to the second shaft TM2. In addition, the first shaft TM1 may operate as a fixed element by the operation of the first brake B1, thereby realizing the forward sixth speed by cooperative operation of respective shafts and may be configured to thus output a shifted torque to the output shaft OS connected with the eighth shaft TM8.

In the forward seventh speed shift-stage D7, the first brake B1 and the first and third clutches C1 and C3 may be operated simultaneously. As a result, the sixth shaft TM6 may be connected with the eighth shaft TM8 by the operation of the first clutch C1, and the fourth shaft TM4 may be connected with the seventh shaft TM7 by the operation of the third clutch C3. Particularly, the torque of the input IS may be input to the second shaft TM2. In addition, the first shaft TM1 may operate as a fixed element by the operation of the first brake B1, thereby realizing the forward seventh speed by cooperative operation of respective shafts and may be configured to thus output a shifted torque to the output shaft OS connected with the eighth shaft TM8.

In the forward eighth speed shift-stage D8, the first brake B1 and the second and third clutches C2 and C3 may be operated simultaneously. As a result, the third shaft TM3 may be connected with the fourth shaft TM4 by the operation of the second clutch C2, and the fourth shaft TM4 may be connected with the seventh shaft TM7 by the operation of the third clutch C3. Particularly, the torque of the input IS may be input to the second shaft TM2. In addition, the first shaft TM1 may operate as a fixed element by the operation of the first brake B1, thereby realizing the forward eighth speed by cooperative operation of respective shafts and may be configured to thus output a shifted torque to the output shaft OS connected with the eighth shaft TM8.

In the forward ninth speed shift-stage D9, the first brake B1 and the third and fourth clutches C3 and C4 may be operated simultaneously. As a result, the fourth shaft TM4 may be connected with the seventh shaft TM7 by the operation of the third clutch C3, and the fifth shaft TM5 may be connected with the seventh shaft TM7 by the operation of the fourth clutch C4. Particularly, the torque of the input IS may be input to the second shaft TM2. In addition, the first shaft TM1 may operate as a fixed element by the operation of the first brake B1, thereby realizing the forward ninth speed by cooperative operation of respective shafts and may be configured to thus output a shifted torque to the output shaft OS connected with the eighth shaft TM8.

In the reverse speed REV, the second brake B2 and the third and fourth clutches C3 and C4 may be operated simultaneously. As a result, the fourth shaft TM4 may be connected with the seventh shaft TM7 by the operation of the third clutch C3, and the fifth shaft TM5 may be connected with the seventh shaft TM7 by the operation of the fourth clutch C4. Particularly, the torque of the input IS may be input to the second shaft TM2. In addition, the third shaft TM3 may operate as a fixed element by the operation of the second brake B2, thereby realizing the reverse speed by cooperative operation of respective shafts and may be configured to thus output a shifted torque to the output shaft OS connected with the eighth shaft TM8.

As described above, a planetary gear train according to an exemplary embodiment of the present invention may realize at least nine forward speeds and at least one reverse speed by operating four planetary gear sets PG1, PG2, PG3, and PG4 by operating the four clutches C1, C2, C3, and C4 and the two brakes B1 and B2.

In addition, a planetary gear train according to an exemplary embodiment of the present invention may realize shift stages appropriate for rotation speed of an engine due to multi-stages of an automatic transmission and improve driving stability of a vehicle by utilizing a low rotation speed of an engine. A planetary gear train according to an exemplary embodiment of the present invention may maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A planetary gear train of claim of an automatic transmission for a vehicle, comprising:
   an input shaft configured to receive an engine torque;
   an output shaft configured to output a shifted torque;
   a first planetary gear set having first, second, and third rotational elements;
   a second planetary gear set having fourth, fifth, and sixth rotational elements;

a third planetary gear set having seventh, eighth, and ninth rotational elements;
a fourth planetary gear set having tenth, eleventh, and twelfth rotational elements;
a first shaft connected with the first rotational element;
a second shaft interconnecting the second rotational element, the fourth rotational element, and seventh rotational element, and directly connected with the input shaft;
a third shaft interconnecting the third rotational element and the eleventh rotational element;
a fourth shaft interconnecting the fifth rotational element and the ninth rotational element, and selectively connected with the third shaft;
a fifth shaft connected with the sixth rotational element;
a sixth shaft connected with the eighth rotational element;
a seventh shaft connected with the tenth rotational element, and selectively connected with the fourth shaft and the fifth shaft respectively; and
an eighth shaft connected with the twelfth rotational element, selectively connected with the sixth shaft, and directly connected with the output shaft.

2. The planetary gear train of claim 1, wherein the first shaft and the third shaft are selectively connected with a transmission housing respectively.

3. The planetary gear train of claim 1, wherein:
the first, second, and third rotational element of the first planetary gear set are respectively a first sun gear, a first planet carrier, and a first ring gear of the first planetary gear set;
the fourth, fifth, and sixth rotational element of the second planetary gear set are respectively a second sun gear, a second planet carrier, and a second ring gear of the second planetary gear set;
the seventh, eighth, and ninth rotational elements of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

4. The planetary gear train of claim 2, further comprising:
a first clutch selectively connecting the sixth shaft and the eighth shaft;
a second clutch selectively connecting the third shaft and the fourth shaft;
a third clutch selectively connecting the fourth shaft and the seventh shaft;
a fourth clutch selectively connecting the fifth shaft and the seventh shaft;
a first brake selectively connecting the first shaft and the transmission housing; and
a second brake selectively connecting the third shaft and the transmission housing.

5. A planetary gear train of claim of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements; and
a fourth planetary gear set having tenth, eleventh, and twelfth rotational elements,
wherein the input shaft is directly connected with the second rotational element,
wherein the output shaft is directly connected with the twelfth rotational element,
wherein the second rotational element is directly connected with the fourth rotational element and the seventh rotational element,
wherein the third rotational element is directly connected with the eleventh rotational element,
wherein the fifth rotational element is directly connected with the ninth rotational element, and is selectively connected with the third rotational element,
wherein the tenth rotational element is selectively connected with the fifth rotational element and the sixth rotational element respectively, and
wherein the twelfth rotational element is selectively connected with the eighth rotational element.

6. The planetary gear train of claim 5, wherein the first rotational element and the third rotational element are selectively connected with a transmission housing respectively.

7. The planetary gear train of claim 5, wherein:
the first, second, and third rotational element of the first planetary gear set are respectively a first sun gear, a first planet carrier, and a first ring gear of the first planetary gear set;
the fourth, fifth, and sixth rotational element of the second planetary gear set are respectively a second sun gear, a second planet carrier, and a second ring gear of the second planetary gear set;
the seventh, eighth, and ninth rotational element of the third planetary gear set are respectively a third sun gear, a third planet carrier, and a third ring gear of the third planetary gear set; and
the tenth, eleventh, and twelfth rotational elements of the fourth planetary gear set are respectively a fourth sun gear, a fourth planet carrier, and a fourth ring gear of the fourth planetary gear set.

8. The planetary gear train of claim 6, further comprising:
a first clutch selectively connecting the eighth rotational element and the twelfth rotational element;
a second clutch selectively connecting the third rotational element and the fifth rotational element;
a third clutch selectively connecting the fifth rotational element and the tenth rotational element;
a fourth clutch selectively connecting the sixth rotational element and the tenth rotational element;
a first brake selectively connecting the first rotational element and the transmission housing; and
a second brake selectively connecting the third rotational element and the transmission housing.

\* \* \* \* \*